US008223709B2

(12) United States Patent
Lambrix et al.

(10) Patent No.: US 8,223,709 B2
(45) Date of Patent: Jul. 17, 2012

(54) AUDIENCE RESPONSE SYSTEM AND METHOD WITH FREQUENCY AGILE TRANSMISSION PROTOCOL

(75) Inventors: Timothy R. Lambrix, West Olive, MI (US); Brian T. Harvey, Zeeland, MI (US); Steven S. Davis, Holland, MI (US); William S. Buehler, Zeeland, MI (US)

(73) Assignee: Fleetwood Group, Inc., Holland, MI (US)

( * ) Notice: Subject to any disclaimer, the term of this patent is extended or adjusted under 35 U.S.C. 154(b) by 412 days.

(21) Appl. No.: 12/554,519

(22) Filed: Sep. 4, 2009

(65) Prior Publication Data
US 2010/0061282 A1    Mar. 11, 2010

Related U.S. Application Data

(60) Provisional application No. 61/095,431, filed on Sep. 9, 2008.

(51) Int. Cl.
*H04W 4/00* (2009.01)
*H04B 7/26* (2006.01)
(52) U.S. Cl. ......... 370/329; 370/341; 455/416; 455/518
(58) Field of Classification Search .................. None
See application file for complete search history.

(56) References Cited

U.S. PATENT DOCUMENTS

| 5,379,213 A | 1/1995 | Derks |
| RE35,449 E | 2/1997 | Derks |
| 7,277,671 B2 * | 10/2007 | Glass et al. .................. 455/2.01 |
| 7,599,703 B2 | 10/2009 | Derks et al. |
| 7,715,532 B2 * | 5/2010 | Simpson .................... 379/88.18 |
| 7,715,780 B1 * | 5/2010 | Beamish et al. ............. 455/2.01 |
| 7,746,820 B2 | 6/2010 | Buehler et al. |
| 7,747,261 B2 * | 6/2010 | Derks ............................. 455/458 |

(Continued)

FOREIGN PATENT DOCUMENTS

GB    2101847 A    6/1982

(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US09/56080, mailed Apr. 1, 2010.

(Continued)

*Primary Examiner* — Chi Pham
*Assistant Examiner* — Soon-Dong Hyun
(74) *Attorney, Agent, or Firm* — Gardner, Linn, Burkhart & Flory, LLP

(57) ABSTRACT

A frequency agile wireless response system and method of retrieving user response data from a plurality of users includes providing a base unit and a plurality of handheld response units, each communicating with the base unit over a wireless communication link using a frequency agile communication protocol. Base signals are sent with the base unit to the response units over the wireless communication link. Response signals are sent from the response units to the base unit over the wireless communication link. The base signals include a master transmission and at least occasionally include an extension transmission. The master transmission includes information establishing a time mark for the response units. The master transmission also includes information enabling the response units to receive any extension transmission associated with that base signal.

23 Claims, 7 Drawing Sheets

U.S. PATENT DOCUMENTS

| | | | |
|---|---|---|---|
| 2003/0215780 A1* | 11/2003 | Saar et al. ..................... | 434/351 |
| 2003/0236891 A1* | 12/2003 | Glass et al. ................... | 709/227 |
| 2004/0033478 A1* | 2/2004 | Knowles et al. ............. | 434/350 |
| 2004/0229642 A1 | 11/2004 | Derks et al. | |
| 2006/0072497 A1 | 4/2006 | Buehler et al. | |
| 2007/0042724 A1 | 2/2007 | Derks | |
| 2008/0316953 A1 | 12/2008 | Buehler et al. | |
| 2009/0040183 A1 | 2/2009 | Buehler et al. | |

FOREIGN PATENT DOCUMENTS

| | | |
|---|---|---|
| GB | 2337669 B | 3/2003 |
| WO | 9618982 A1 | 6/1996 |
| WO | 0042494 A1 | 7/2000 |
| WO | 2004017662 A2 | 2/2004 |

OTHER PUBLICATIONS

International Preliminary Report on Patentability (Form PCT/IB/373) from corresponding Patent Cooperation Treaty Patent Application No. PCT/US09/56080 mailed Mar. 24, 2011.

Commonly assigned co-pending U.S. Appl. No. 12/556,676, filed Sep. 10, 2009, entitled Audience Response Device, Method, and System.

Office Action for U.S. Patent Application Publication No. 2006/0072497 A1, published on Apr. 6, 2006, entitled Response System and Method With Dynamic Personality Assignment.

Office Action for U.S. Patent Application Publication No. 2007/0042724 A1, published on Feb. 22, 2007, entitled Asynchronous Response System With Acknowledge.

Supplementary European Search Report from corresponding European Patent Application No. 09813488.5, filed on Sep. 9, 2009, entitled Audience Response System and Method With Frequency Agile Transmission Protocol.

Haartsen, Jaap C., The Bluetooth Radio System, IEEE Personal Communications, IEEE Communications Society, US, vol. 7, No. 1, Feb. 1, 2000, pp. 28-36.

* cited by examiner

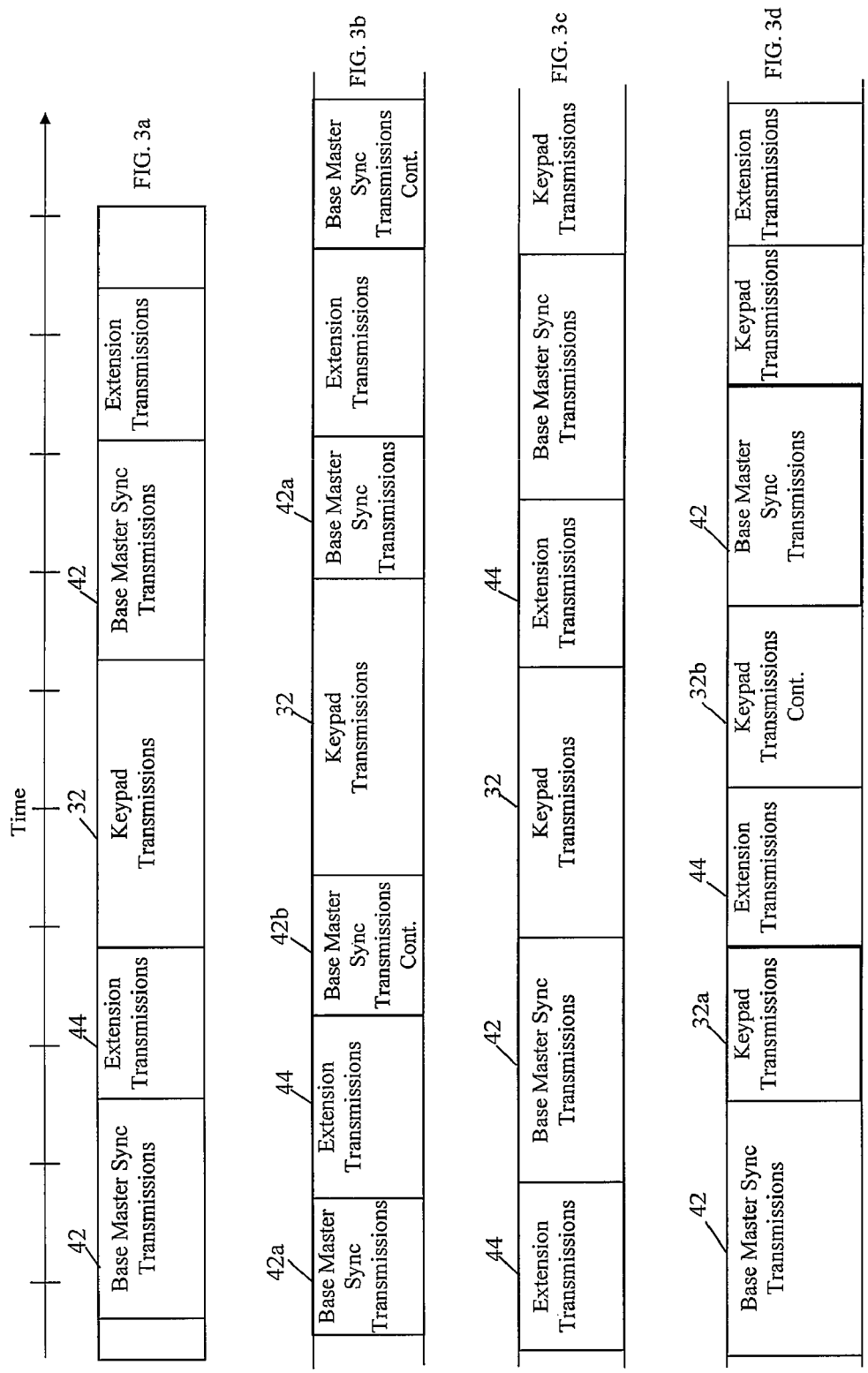

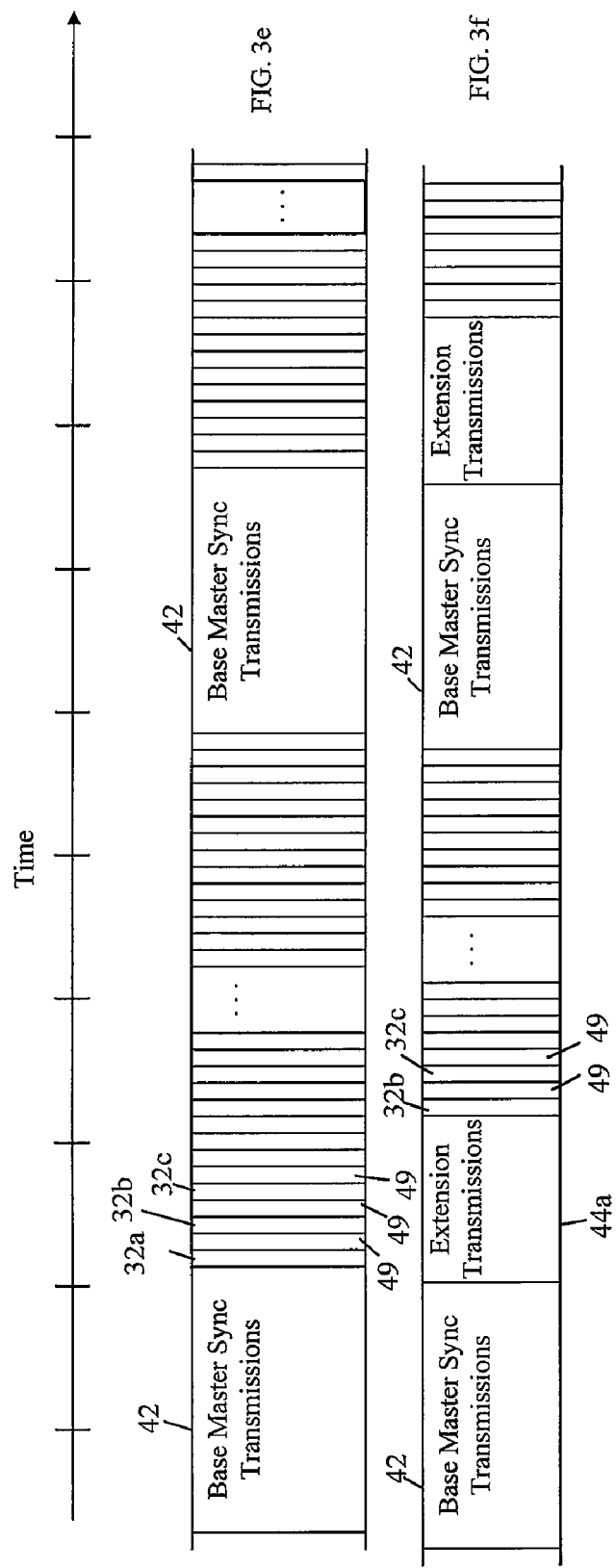

AUDIENCE RESPONSE SYSTEM AND METHOD WITH FREQUENCY AGILE TRANSMISSION PROTOCOL

CROSS REFERENCE TO RELATED APPLICATION

This application claims priority from U.S. provisional patent application Ser. No. 61/095,431, filed on Sep. 9, 2008, the disclosure of which is hereby incorporated herein by reference in its entirety.

BACKGROUND OF THE INVENTION

The present invention is directed to an audience response system for retrieving user responses entered into handheld response units and a method of retrieving audience responses and, in particular, to such a system and method utilizing a frequency agile transmission protocol.

Wireless response systems are capable of retrieving responses from a large number of users wirelessly. Such systems may operate on a fixed frequency or may utilize a variety of frequencies. The latter is known as a frequency agile system. An example of a frequency agile system is a spread-spectrum frequency hopping protocol, such as the type disclosed in commonly assigned U.S. Pat. Application Publication No. 2004/0229642 A1 entitled WIRELESS POLLING SYSTEM USING SPREAD-SPECTRUM COMMUNICATION, the disclosure of which is hereby incorporated herein by reference. However, other types of frequency agile protocols are known.

International Patent Application Publication No. WO 2006/041743 A2 entitled RESPONSE SYSTEM AND METHOD WITH DYNAMIC PERSONALITY ASSIGNMENT, which is commonly assigned with the present application, discloses a response system and method in which the base unit is capable of assigning personality data to the response units in order to facilitate communication between the response unit and the base unit. The personality data, which may include, for example, a timeslot in which the particular response unit is assigned, may be sent upon request by the response unit to "join" that base unit. At the beginning of a voting session, it may be necessary for a large number of response units to send join requests to the base unit and to receive personality data from the base unit.

The base unit may communicate various types of information with the response units. In certain systems, the base unit sends out polling packets to retrieve response data from the response units. However, in other systems, the response units transmit asynchronously without the necessity for a transmission from the base unit. Regardless of the type of system, the base unit may be capable of transmitting other information to the response units. Examples of such other information include global message packets and firmware download packets. It may also include test question tables to be displayed at the response units. It also may include configuration data and login data for the particular response units. It may also include acknowledge signals of the type disclosed in commonly assigned U.S. Pat. No. 5,724,357 entitled REMOTE RESPONSE SYSTEM AND DATA TRANSFER PROTOCOL.

SUMMARY OF THE INVENTION

The present invention provides a frequency agile remote response system that is capable of communicating message data between the base unit and the response units as well as response data from the response units to the base unit in a manner which is fast and efficient.

A frequency agile wireless response system and method of retrieving user response data from a plurality of users, according to an aspect of the invention, includes providing a base unit and a plurality of handheld response units, each communicating with the base unit over a wireless communication link using a frequency agile communication protocol. Base signals are sent with the base unit to the response units over the wireless communication link. Response signals are sent from the response units to the base unit over the wireless communication link. The base signals include a master transmission and at least occasionally include an extension transmission. The master transmission includes information establishing a time mark for the response units. The master transmission also includes information enabling the response units to receive any extension transmission associated with that base signal.

A frequency agile wireless response system and method of retrieving user response data from a plurality of users, according to another aspect of the invention, includes providing a base unit and a plurality of handheld response units, each communicating with the base unit over a wireless communication link using a frequency agile communication protocol. Base signals are sent with the base unit to the response units over the wireless communication link. Response signals are sent from the response units to the base unit over the wireless communication link. The base signals include a master transmission and at least occasionally include an extension transmission. A response unit sends a response unit acknowledge to the base unit in response to receipt of a valid extension transmission. The base unit repeats a particular extension transmission unless a corresponding response unit acknowledge is received by the base unit and sends a base unit acknowledge upon receipt of a response unit acknowledge.

These and other objects, advantages and features of this invention will become apparent upon review of the following specification in conjunction with the drawings.

BRIEF DESCRIPTION OF THE DRAWINGS

FIGS. 3a-3f are diagrams of alternative frequency agile communication protocols;

FIG. 4 is flowchart of a control program for the base unit using the protocol in FIG. 3a;

DESCRIPTION OF THE PREFERRED EMBODIMENT

Figure 1:
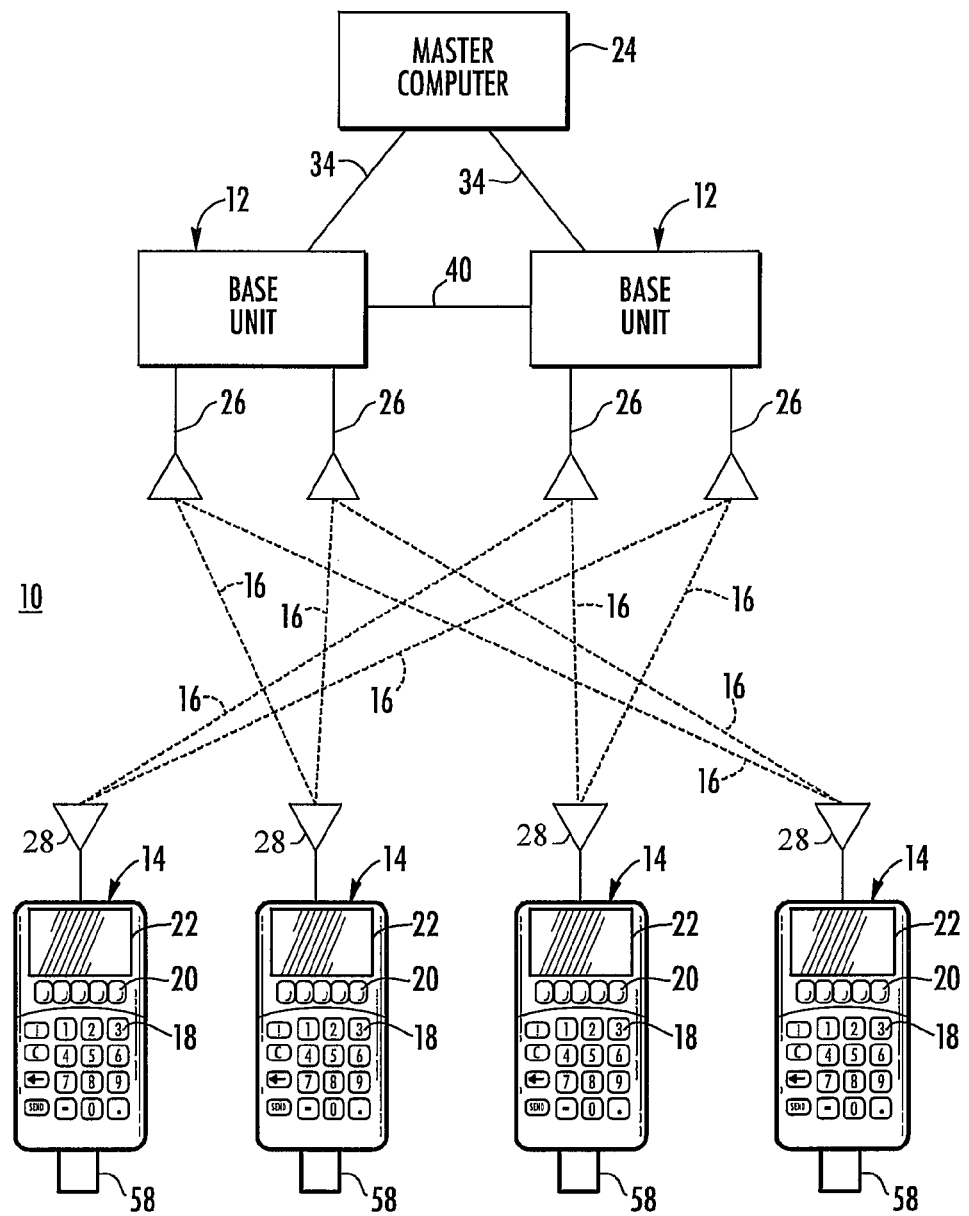
FIG. 1 is a block diagram of a wireless communication system useful with the invention.

Referring now specifically to the drawings, and the illustrative embodiments depicted therein, a wireless response system 10 includes one or more base units 12 and a plurality of response units, keypads, or handheld units 14, which communicate with the base unit(s) over one or more wireless communication links 16 of the type disclosed in commonly assigned U.S. Pat. Application Publication No. 2003/0153321 A1 entitled WIRELESS RESPONSE SYSTEM AND METHOD, the disclosure of which is hereby incorporated herein by reference (FIG. 1). Wireless response system 10 is disclosed in detail in the previously referred to patent applications and will not be described in detail herein. Suffice it to say, base unit(s) 12 send polling signals over wireless communication link 16 and the response units send response data to the base unit over the wireless communication link(s) in response to the polling signals. The response data, or voting data, is entered in the respective response unit by a user. An illustration of the protocol of the communication between base unit 12 and the response unit may be generally as disclosed in detail in commonly assigned U.S. Pat. No. Re. 35,449 for a REMOTE TWO-WAY TRANSMISSION AUDIENCE POLLING AND RESPONSE SYSTEM; U.S. Pat. No. 5,724,357 for a REMOTE RESPONSE SYSTEM AND DATA TRANSFER PROTOCOL; and U.S. Pat. No. 6,021,119 for a MULTIPLE SITE INTERACTIVE RESPONSE SYSTEM, the disclosures of which are hereby incorporated herein by reference. Each response unit 14 may include user input devices, such as a keypad 18, a series of soft keys 20, or the like. Each response unit 14 may additionally include a display 22 for displaying information to the user, as well as indicating user selections. Base unit 12 may be connected with a command computer 24 that includes host software in order to provide top level control of wireless response system 10, as well as to run software applications to analyze data produced by wireless response system 10.

In the illustrative embodiment, two base units 12 are illustrated, each with a pair of transceivers 26. However, it should be understood that for certain applications, only one base unit 12, or more than two base units 12, may be utilized and base unit 12 may utilize only one transceiver 26 or more than two transceivers 26. Also, each response unit may be capable of communicating with a different base unit at a different time as disclosed in commonly assigned U.S. patent application Ser. No. 12/127,254 filed May 27, 2008, by William S. Buehler, Raymond E. Baker, Jr., Timothy R. Lambrix, Michael B. Hall and Troy A. Redder, entitled AUDIENCE RESPONSE SYSTEM AND METHOD WITH MULTIPLE BASE UNIT CAPABILITY, the disclosure of which is hereby incorporated herein by reference.

Wireless response system 10 utilizes a frequency agile transmission protocol in which different frequencies are used at different times for transmissions between base unit(s) 12 and response units 14. One example of such protocol is spread-spectrum frequency hopping protocol. Such frequency hopping protocol is made up of a plurality of distinct frequency channels, or hops. Each frequency hop, or channel, has a unique frequency band. An example of such a spread-spectrum system is disclosed in commonly assigned U.S. Pat. Application Publication No. 2004/0229642 A1 entitled WIRELESS POLLING SYSTEM USING SPREAD-SPECTRUM COMMUNICATION, the disclosure of which is hereby incorporated herein by reference.

Figure 2:
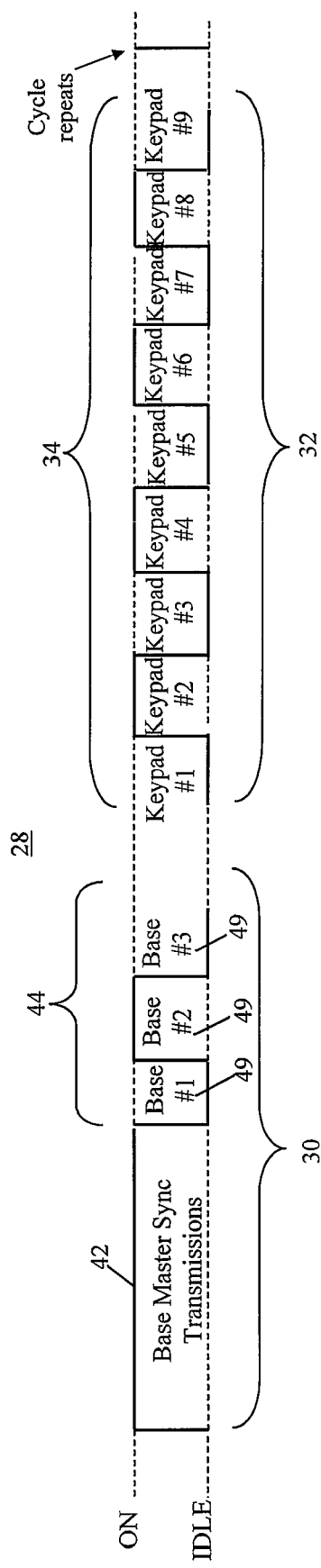
FIG. 2 is a diagram of a frequency agile communication protocol.

In one embodiment, a frequency agile transmission protocol 28 includes a base signal 30 that is sent by base unit 12 to the response units 14 and response units 14 send response unit signals 32 in a response unit transmission period 34 in response to the base signal 30 (FIG. 2). Base signal 30 includes a master transmission 42 and may include an optional extension transmission 44 made up of data packet(s) 49. Master transmission 42 establishes a time mark for response units 14 to determine when to respond to the base signal. As will be set forth in more detail below, the response units determine a time to send a response after the time mark. If necessary, the response units may take into account any extension transmission 44 when determining a time to send a response. Master transmission 42 additionally includes information that enables response units 14 to receive extension transmission 44. This information may include the length of extension transmission 44, which, as will be explained in more detail below, may be a variable length of anywhere from a zero length to a maximum length.

In the illustrated embodiment, master transmission 42 is sent multiple times, one at each of the distinct hop frequencies that make up the frequency agile transmission protocol 28. By way of example, if 15 distinct frequencies are used in the protocol, master transmission 42 is repeated 15 times, each at a different frequency. This allows each response unit to listen on a home frequency assigned to that response unit and to receive a master transmission. Included within master transmission 42, in addition to the time mark, is the information enabling the response units to receive extension transmissions 44. In the illustrative embodiment, the data packets making up extension transmissions 44 may be all sent on the same hop frequency or may be sent on different frequencies. The information that is sent in the master transmission 44 includes the frequency, if all of the extension transmissions are on the same frequency, or a hop table, or the like, if the extension transmissions are on different hop frequencies. The master transmission may also include data on the length of the extension transmission 44, namely, the number of data packets, if any, that make up the extension transmission. This is particularly useful if the transmission is between the master transmission and the response unit signals in order to allow the response units to set their timers for the correct timeslot in which to send their respective response unit signals. Additionally, the master transmission 42 may include identification information that is unique to a particular one or one(s) of the response units that is intended to process that extension transmission. As will be explained in more detail below, the identification information may include the personality that is assigned to the response unit(s) or, if no personality is assigned to the response unit(s), the identification information may be a serial number that is permanently or semi-permanently assigned to that response unit, such as at the time of manufacture. When the response units 14 receive the master transmission on their home frequency, they calculate a time to begin receiving the extension transmission, taking into account the position of the hop frequency on which it receives its master transmission 42 with respect to all of the master transmissions 42 and tunes its receiver to the frequency or hop frequency table at the time to receive the extension transmission 44.

The relationship between the master transmission, the extension transmission(s) and the response unit transmission may differ. In one relationship illustrated in FIG. 3a, extension transmission 44 follows master transmission 42 and the response unit transmissions 32 follow the extension transmissions. In such an arrangement, once the response unit receives the extension transmission, they determine from the identification information in the transmission whether that transmission was intended for that response unit and, if a response transmission is required, the keypad may set the timer for the correct timeslot in which to transmit a response unit signal to the base unit. If desirable, the response unit may turn off its receiver until a time when it is calculated to receive a base signal and may go to a sleep mode until the time it is necessary to send a response unit signal to the base unit.

In another relationship illustrated in FIG. 3b, the extension transmissions 44 occur within the master transmission between master transmission portions 42a, 42b. FIG. 3c illustrates a relationship in which the extension transmission 44 occurs prior to master transmission 42. An advantage of the arrangement illustrated in FIG. 3c is that it is not necessary to inform the response units via the master transmission the length of extension transmission 44 because response unit transmissions 32 occur immediately after the master transmission, so there is no need to reset the response unit timers to compensate for the presence of extension transmissions after the master transmission. Also, the response unit receivers could be left actuated to receive the extension transmission packets after the response unit transmissions.

FIG. 3*d* illustrates an arrangement in which the extension transmissions 44 occur within the unit transmission portions 32*a*, 32*b*. It is also possible to break the extension transmission up into single packs and transmit each after a response unit transmission 32*a*, 32*b*, 32*c*, . . . . The system can be made up of a combination of such arrangements of transmissions as illustrated in FIG. 3*f*.

Figure 4:
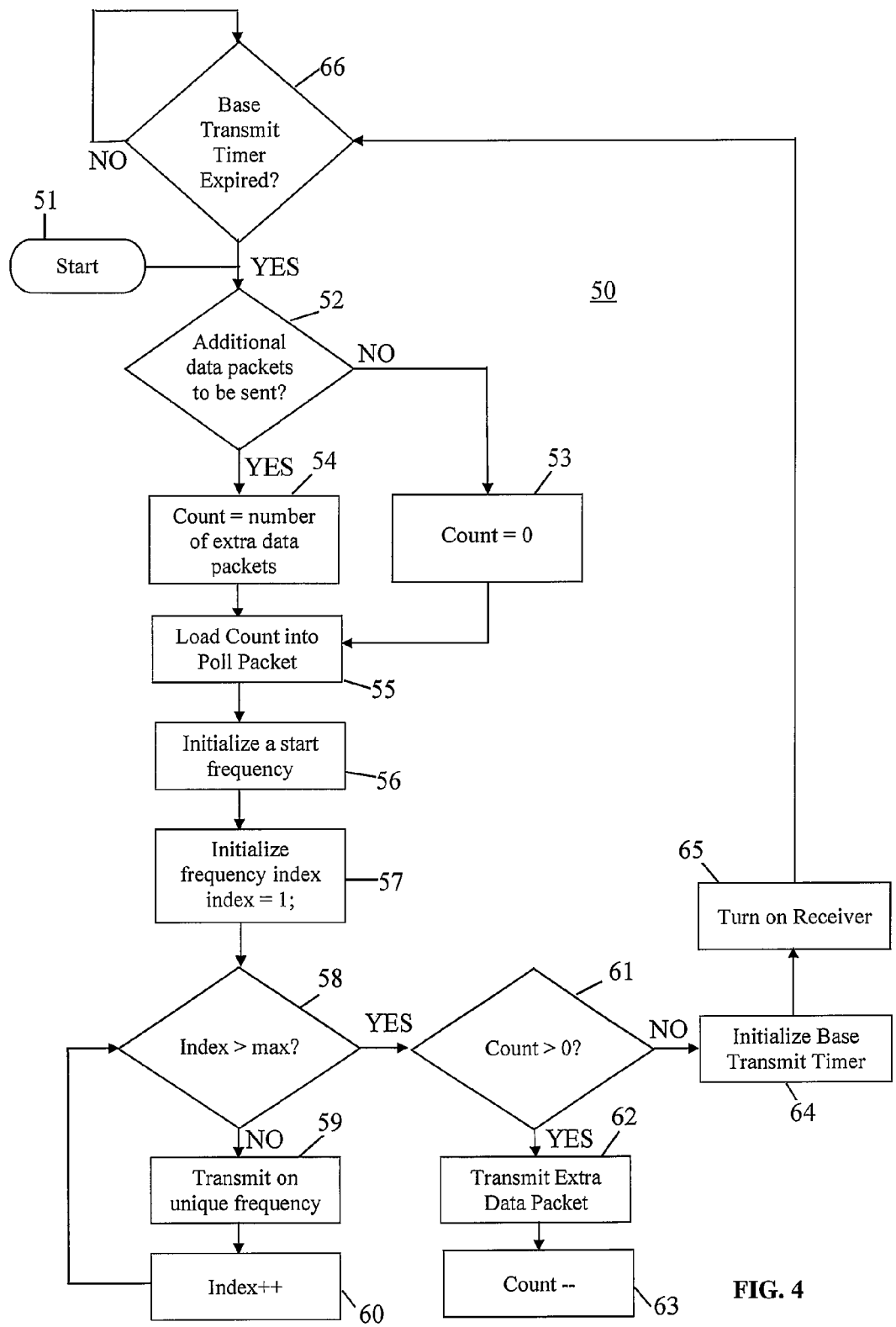
Figure 5:
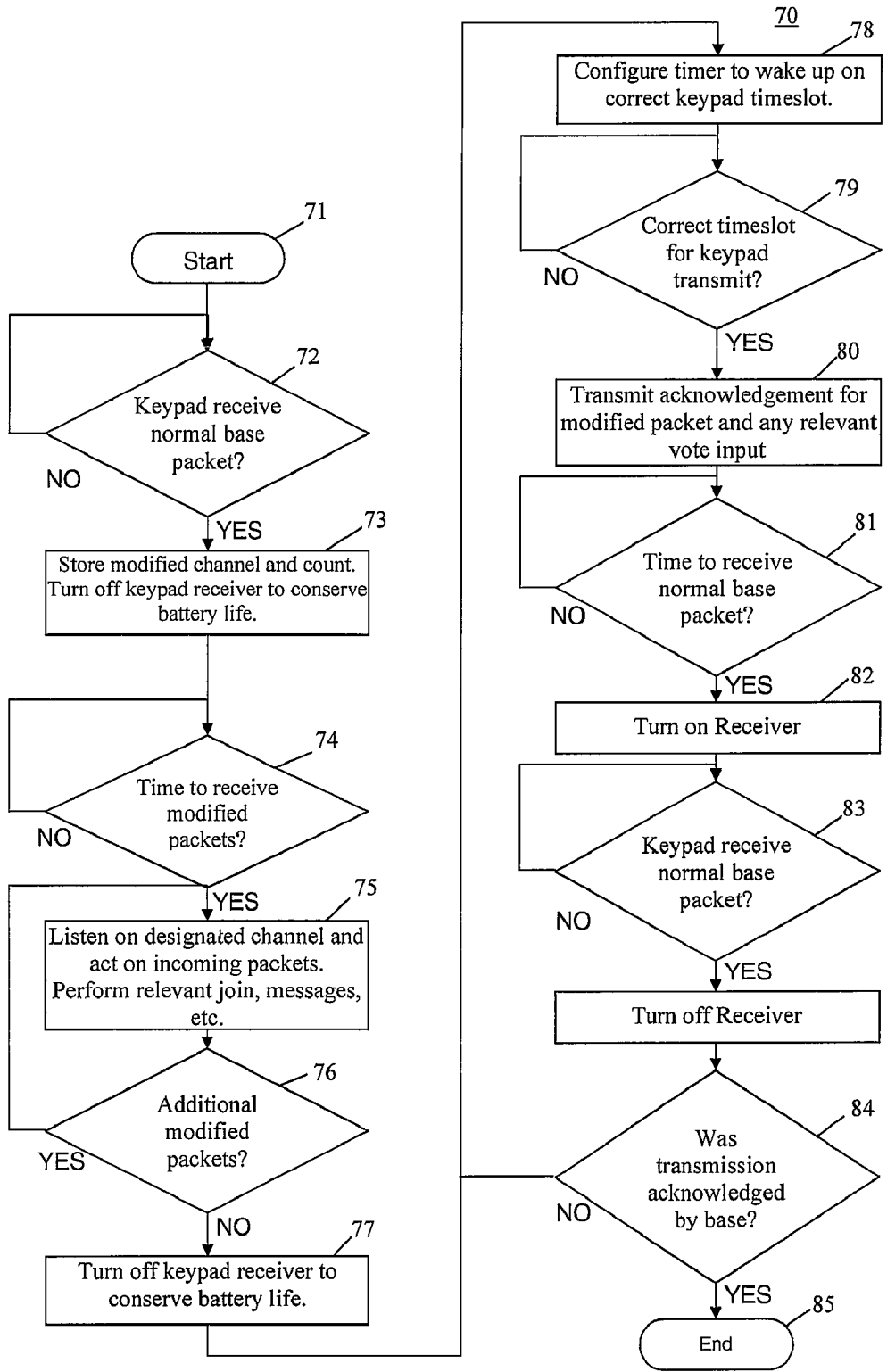
FIG. 5 is a flowchart of a control program for the response units.

A base unit control program 50 may be used to control base unit 12 to carry out the frequency agile transmission protocol illustrated in FIG. 3*a* (FIG. 4). Program 50 begins at 51 by determining whether there are additional data packets 49 to be sent in the extension transmission. This may be performed either in base unit 12 or, if included, in software running on master computer 24. In the illustrative embodiment, the number of additional data packets to be sent is determined by software operating master computer 24 and communicated to the base unit 12. If no additional data packets are to be sent, the count is set to 0 (53). If additional data packets are to be sent, the count is set at a number of extra data packets (54) and the count is loaded into the master transmission (55). Assembly of the master transmission begins at 56 at a particular hop frequency and a frequency index is set to 1 at 57. It is determined at 58 whether the index has reached a maximum set amount. If not, the master transmission is constructed with the next hop frequency (59) and the index is progressed at 60. Once the index reaches the last hop frequency for the master transmission, is determined at 61 whether the data packet count for any extension transmission is greater than 0. If so, the first data packet 49 is placed in the extension transmission 44 (62) and the count is advanced at 63.

Once it is determined at 61 that the count has been decremented to 0, the base signal is constructed. The base transmit timer is initialized at 64 and the base transceiver is powered at 65. The base transmit timer takes into account the number of hop frequencies making up the master transmission as well as the length of the extension transmission. Once it is determined at 66 that the base transmit timer has expired, program 50 returns to begin processing the next base signal 30 at 52.

A response unit control program 70 begins at 71 by determining at 72 whether a master transmission has been received. The response unit decodes and determines the count of the data packets 49 in the extension transmission 44 and the hop frequency on which the extension transmission is to be transmitted (73). At the time that the extension transmission 44 is to be received (74), taking into account the position of the hop frequency on which that response unit receives the master transmission, the response unit listens on the designated channel and receives the specified number of data packets (75). If the particular response unit is identified in the identified information included in the master transmission of the response unit(s) for which the extension transmission is directed, the response unit acts on the incoming data packets and performs the relevant task associated therewith, as will be explained in more detail below (75).

The response unit then determines that it has received all of the data packets (76) and may optionally turn off its receiver to conserve battery life (77). Based on the time mark sent with the master transmission and the determined time to receive the extension transmission and the length of the extension transmission, the response unit may determine the time to its timeslot to transmit response unit signal 32 and configure a timer to wake up at the correct timeslot (78). Once the correct timeslot is reached (79), the response unit transmits its response unit signal including any user input that is entered in its keypad 18 as a vote input and an acknowledge signal, if necessary (80).

The response unit acknowledgement (response acknowledge) is sent at 80 in order to alert the base unit that the response unit has successfully received and performed a validity check on the extension transmission 44. If the extension transmission has been successfully received, the response unit waits for the time to receive the next base signal 30 (81) and turns on its receiver (82) at the appropriate time. The response unit then receives the next base signal 30 (83) and determines whether a base unit acknowledgement (base acknowledge) signal was received from the base unit at 84. The base unit sends a base acknowledge if it receives a response acknowledge in order to confirm to the respective response unit that the response unit may discontinue repeated transmission of the response acknowledge, which ends the process at 85. The base acknowledge may be sent as part of the subsequent base signal utilizing the principles disclosed in commonly assigned U.S. Pat. No. 5,724,357 for a REMOTE RESPONSE SYSTEM AND DATA TRANSFER PROTOCOL, the disclosure of which is hereby incorporated herein by reference. However, other techniques for transmitting the base acknowledge may be used.

If it is determined at 84 that the base acknowledge was not received, the program returns to 78 for the respective response unit to resend the response acknowledge with any user input or, if no user input is present, then by itself. Steps 78 through 84 are repeated until the base acknowledge is received by the respective response unit. Additionally, if the base unit 12 does not receive the response acknowledge, the base will continue to send the extension transmission to that response unit until the response acknowledge is received or until a given number of retries are achieved.

Figure 6:
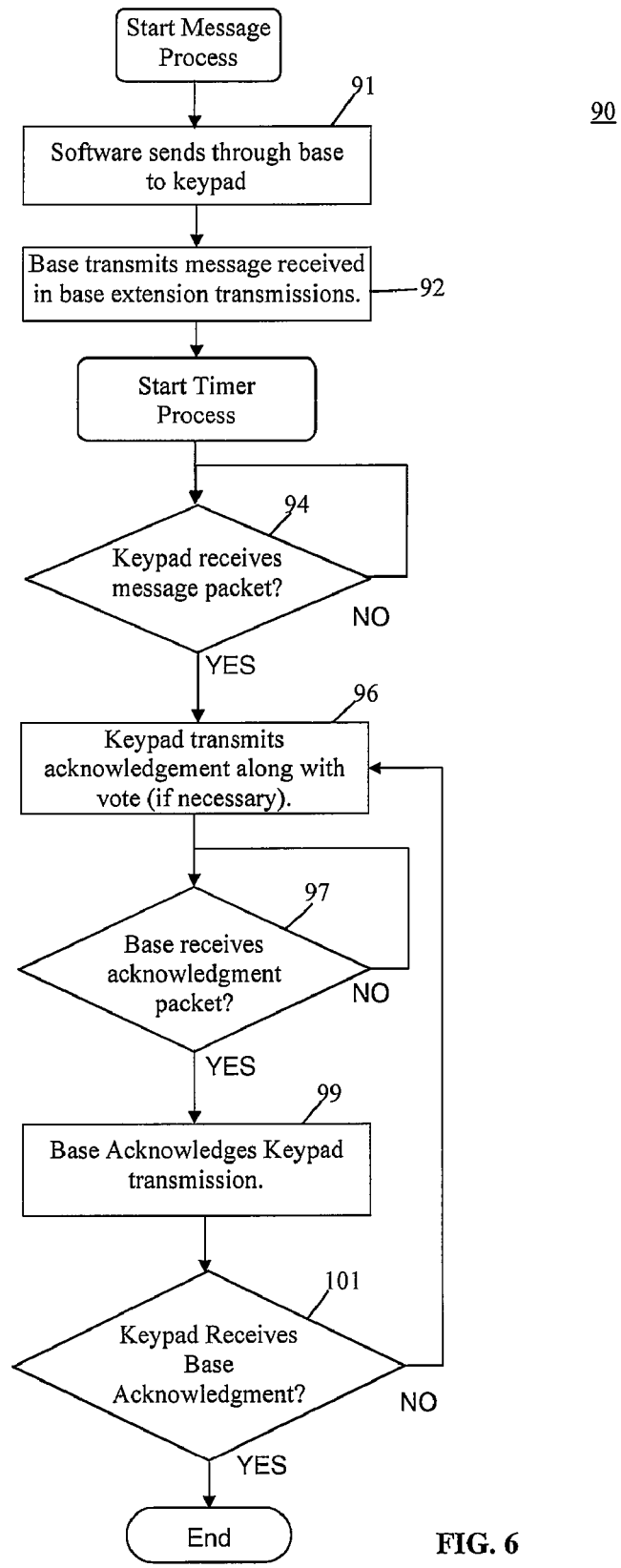
FIG. 6 is a flowchart illustrating two-way acknowledgement between the base unit and the response units.

Thus, wireless response system 10 is capable of carrying out a two-way acknowledge process 90, which is illustrated in FIG. 6. Process 90 begins with the host software running on computer 24 giving directive to the base to send data to a particular response unit (91). Base unit 10 constructs and transmits base signal 30, using control program 50, including master transmission 42, an extension transmission 44 for the particular response unit, and any other extension transmission 44 (92). The response unit(s) receives the base signal and determines the validity of the base signal including extension signal 44 (93). The response unit then determines whether the data packets of the extension transmission were validly received at 94. If not, the response unit just sends any user input, or vote, if necessary. If the extension transmission was validly received, the response unit sends a response acknowledge along with the user input, or vote, at 96.

The base unit receives the response unit signal and determines whether the response acknowledge is present at 97. If it is determined at 98 that the response acknowledge is present, the base unit acknowledges receipt of the keypad transmission at 99. This may be accomplished by setting a base acknowledge for that response unit in the bitmap to be sent with the next base signal (99). Alternatively, the acknowledgement may be sent in extension transmission 44 as will be discussed in more detail below. If the response acknowledge is not received, the base unit retransmits the extension transmission with the next base signal. The response unit determines at 101 if the base signal includes a base acknowledge. If so, the response unit does not retransmit the response acknowledge. If it does not receive a base acknowledge, the response unit resends the acknowledgement with any vote, if necessary (96).

One embodiment includes a polling scenario where a unique identity does not have to be assigned prior to using the system (static mode) nor an on-demand assignment from base/software (dynamic mode). In large venues, assigning unique personalities to thousands of keypads is not practical. Instead of an assigned personality, keypads 14 could use the factory assigned serial number. The serial number is unique to each keypad 14 manufactured. Using a polling diagram of the type illustrated, for example in FIG. 3c, keypad 14 uses a portion of the last digits of the serial number in order to determine what time it should transmit a response unit signal 32 with respect to the base master sync transmissions 42. Using a small portion of the serial number means other keypads 14 may also contain the same value. Using an algorithm, it is possible to change the keypad timing in the event interference occurs either from another keypad or some other radio transmitter. The full serial number is sent with each response unit signal 32. The base unit 12 acknowledges keypads, such as in the base extension transmissions 44 using the full keypad serial number. Each keypad 14 checks all base transmissions for its serial number for verification that the vote was received. The more keypad votes transmitted, the more base extension transmissions may be needed.

Each response unit may alternatively be joined with a particular base unit 12 utilizing the principles disclosed in commonly assigned patent application Ser. No. 11/163,008, filed Sep. 30, 2005, by William S. Buehler, Harry G. Derks, Michael B. Hall, Troy A. Redder, David L. Ramon and Michael S. Glass, for a RESPONSE SYSTEM AND METHOD WITH DYNAMIC PERSONALITY ASSIGNMENT, and patent application Ser. No. 12/191,484, filed Aug. 14, 2008, by William S. Buehler, Harry G. Derks, Michael B. Hall, Troy A. Redder, David L. Ramon and Michael S. Glass, for a RESPONSE SYSTEM AND METHOD WITH DYNAMIC PERSONALITY ASSIGNMENT, the disclosures of which are hereby collectively incorporated by reference in their entirety. This may be accomplished by a base sending personality data, such as a communication address, to a joining response unit. When a response unit that is joined with one or more base units sends a valid response unit transmission to that base unit(s), the base unit(s) sends an acknowledgement that is tied to the address of the response unit so that the response unit being acknowledged will recognize its acknowledge.

Alternatively, the response units need not be joined to any particular base or bases, but may be capable of communicating with all base units 12. In such an embodiment, the base units may be set to the same base ID, such as a common channel or hop frequency table, so that any base unit is capable of receiving a response unit transmission from any response unit. When a base unit receives a valid response unit transmission, which includes the unique serial number of that unit, that base unit sends an acknowledge that contains the unique serial number.

Once a transmitting response unit receives an acknowledge including its unique serial number, that response unit stops retransmitting its response unit transmission. In order to further enhance the ability of any response unit 14 to communicate with substantially any base unit 12, each response unit may be capable of determining in which of the timeslots, or keypad transmission intervals, that response unit will transmit. This allows the response units to transmit in different timeslots of response unit transmission period 34 without necessarily being assigned a communication address. While it is still possible that more than one response unit will attempt to transmit in the same timeslot resulting in a collision, the tendency for collision, and the necessity for retransmission of the response unit transmissions, should be significantly less than asynchronous response systems of the type disclosed in U.S. Pat. No. 7,330,716 B2.

In order to further reduce the risk of collision between response unit transmissions, the response units may be organized into groups with each group responding to a different base unit transmission. In one embodiment, the timeslot in which a response unit transmits is a function of a portion, such as the least significant digits, of the unique serial number of that response unit. Thus, an algorithm stored in each response unit may be used to calculate a timeslot in which that response unit will make its response unit transmission based on a portion of the unique serial number of that response unit. In one embodiment, the lower eight (8) bits of the serial number are used to calculate a timeslot for that response unit. In another embodiment, both the timeslot in which a response unit transmits and the group to which that response unit is assigned may be functions of different portions of the unique serial number of that response unit.

Such a response system may allow a very large number of response units, such as 10,000, for example, to communicate with a large number of base units. This may be accomplished because each response unit is able to communicate with each base and to receive an acknowledge signal from a base upon receipt of a valid response unit transmission. This is facilitated by the use of unique serial numbers that are assigned to the response units to tie an acknowledge to one particular response unit.

Other embodiments may use both a personality, such as a communication address, assigned by a base unit(s) to each response unit in combination with the unique serial number assigned to each response unit, such as at the time of manufacture. While each response unit would have a more defined timeslot in which to transmit its response unit transmission, the base unit(s) may still be able to receive a response unit transmission and acknowledge that response unit transmission, even if transmitted in a timeslot not assigned to that response unit.

As previously set forth, the acknowledge from the base unit to the response units upon receipt of a valid response unit transmission may be provided as part of master transmission 42 or may be sent in the packets 49 of extension transmission 44. By way of example, in a master transmission 42 sent on 75 hop frequencies, an order of 100 response units may be acknowledged, such as by using the technique disclosed in commonly assigned U.S. Pat. No. 5,724,357, for a REMOTE RESPONSE SYSTEM AND DATA TRANSFER PROTOCOL, the disclosure of which is hereby incorporated herein by reference. Acknowledgements may be sent in extension transmission 44.

Frequency agile transmission protocol 28 has the potential to send messages to one or more response units in a rapid manner. In contrast to the master transmission 42, which is repeated on every hop frequency, extension transmission 44 need only be sent once on a particular hop frequency or according to a particular hop frequency table. Moreover, the data packets making up the extension transmission can be designated for a particular response unit. The base signal has a dynamic length that is capable of expanding when it is necessary to send data packets to the response unit(s) and contracting when it is not necessary to send a data packet or fewer data packets. This allows a greater throughput of data exchanged between the base unit and the response units.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A frequency agile wireless response system, comprising:
    a base unit and a plurality of handheld response units, each communicating with said base unit over a wireless communication link using a frequency agile communication protocol;
    said base unit sending base signals to said response units over said at least one wireless communication link;
    said response units sending response unit signals to said base unit over said at least one wireless communication link; and
    wherein said base signals include a master transmission and said base signals are configured to include an extension transmission, the master transmission including a time mark for said response units and reception information enabling said response units to receive any extension transmission associated with that base signal and wherein the extension transmission comprises a variable length transmission and wherein said master transmission includes length information for enabling said response units to determine the length of the variable length transmission.

2. The system as claimed in claim 1 wherein the variable length transmission is made up of at least one packet and wherein the length of a variable length transmission is a function of the number of packets in that transmission.

3. The system as claimed in claim 1 wherein the extension transmission is made up of data packets and wherein the length information comprises the number of data packets included in the extension transmission.

4. The system as claimed in claim 1 wherein said response units determine a time to send response data after the time mark taking into account any extension transmission.

5. The system as claimed in claim 1 wherein said at least one wireless communication link comprises a frequency hopping protocol and wherein said master transmission includes information regarding a frequency hopping table used for the extension transmission.

6. The system as claimed in claim 5 wherein said extension transmission is sent on one hop frequency.

7. The system as claimed in claim 5 wherein said extension transmission is sent on a plurality of hop frequencies.

8. The system as claimed in claim 1 wherein said master transmission includes identification information that identifies at least one particular response unit, and wherein the at least one particular response unit processes the extension transmission.

9. The system as claimed in claim 8 wherein each of said response units includes a unique serial number that is generally permanently assigned to that response unit and wherein the serial number of a response unit is included in response unit signals sent by that response unit.

10. The system as claimed in claim 9 wherein at least one chosen from the master transmission and the extension transmission includes the serial number of the at least one particular response unit.

11. The system as claimed in claim 8 wherein the identification information further includes a personality assigned to that response unit, the personality facilitating communication of that response unit with said base unit.

12. The system as claimed in claim 11 wherein the personality is assigned to that particular one of said response units by said base unit.

13. The system as claimed in claim 12 wherein the personality is assigned to that particular one of said response units in response to a join request sent by that response unit.

14. The system as claimed in claim 1 wherein said extension transmission includes message data and wherein the at least one particular response unit processes the message data.

15. The system as claimed in claim 14 wherein the message data comprises at least one chosen from (i) a test question table, (ii) firmware download data, (iii) configuration data, (iv) login data, (v) textual strings for display, (vi) answer data and (vii) graphic display data.

16. The system as claimed in claim 1 wherein a response unit sends a response unit acknowledge to the base unit in response to receipt of a valid extension transmission.

17. The system as claimed in claim 16 wherein said base unit repeats a particular extension transmission unless a corresponding response unit acknowledge is received by said base unit.

18. The system as claimed in claim 16 wherein said base unit sends a base unit acknowledge upon receipt of a response unit acknowledge.

19. The system as claimed in claim 18 wherein a response unit repeats a response unit acknowledge transmission unless a corresponding base unit acknowledge is received by that response unit.

20. A frequency agile wireless response system, comprising:
    a base unit and a plurality of handheld response units, each communicating with said base unit over a wireless communication link using a frequency agile communication protocol;
    said base unit sending base signals to said response units over said at least one wireless communication link;
    said response units sending response unit signals to said base unit over said at least one wireless communication link; and
    wherein said base signals include a master transmission and said base signals are configured to include an extension transmission, the master transmission including a time mark for said response units and reception information enabling said response units to receive any extension transmission associated with that base signal, wherein said master transmission includes identification information that identifies at least one particular response unit and wherein the at least one particular response unit processes the extension transmission, wherein the identification information includes a personality assigned to that response unit, the personality facilitating communication of that response unit with said base unit, wherein the personality is assigned to that particular one of said response units by said base unit in response to a join request sent by that response unit, wherein the response unit signal comprises a response unit transmission including at least one chosen from a response data signal and a join request signal, the response data signal including response data entered in the respective response unit by a user.

21. A frequency agile wireless response system, comprising:
    a base unit and a plurality of handheld response units; each communicating with said base unit over a wireless communication link using a frequency agile communication protocol;

said base unit sending base signals to said response units over said at least one wireless communication link;

said response units sending response unit signals to said base unit over said at least one wireless communication link;

wherein said base signals include a master transmission and said base signals are configured to include an extension transmission;

wherein a response unit sends a response unit acknowledge to the base unit in response to receipt of a valid extension transmission;

wherein said base unit repeats a particular extension transmission unless a corresponding response unit acknowledge is received by said base unit; and wherein said base unit sends a base unit acknowledge upon receipt of a response unit acknowledge.

22. A method of retrieving user response data from a plurality of users, comprising:

providing a base unit and a plurality of handheld response units, each communicating with said base unit over a wireless communication link using a frequency agile communication protocol;

sending base signals with said base unit to said response units over said wireless communication link;

sending response signals with said response units to said base unit over said wireless communication link; and wherein said sending base signals includes sending a master transmission and at least occasionally including an extension transmission, the master transmission including information establishing a time mark for said response units and information enabling said response units to receive any extension transmission associated with that base signal wherein the extension transmission corn rises a variable length transmission and wherein said sending a master transmission includes sending length information for enabling said response units to determine the length of the variable length transmission.

23. A method of retrieving user response data from a plurality of users, comprising:

providing a base unit and a plurality of handheld response units, each communicating with said base unit over a wireless communication link using a frequency agile communication protocol;

said base unit sending base signals to said response units over said at least one wireless communication link;

sending response unit signals with said response units to said base unit over said at least one wireless communication link;

wherein said sending base signals includes sending a master transmission and at least occasionally including an extension transmission;

wherein said sending response unit signals includes sending a response unit acknowledge to the base unit in response to receipt of a valid extension transmission;

wherein said sending base signals includes repeating a particular extension transmission unless a corresponding response unit acknowledge is received by said base unit; and wherein said sending base signals includes sending a base unit acknowledge upon receipt of a response unit acknowledge.

* * * * *

UNITED STATES PATENT AND TRADEMARK OFFICE
CERTIFICATE OF CORRECTION

PATENT NO. : 8,223,709 B2  
APPLICATION NO. : 12/554519  
DATED : July 17, 2012  
INVENTOR(S) : Timothy R. Lambrix et al.

Page 1 of 1

It is certified that error appears in the above-identified patent and that said Letters Patent is hereby corrected as shown below:

In the Claims

Column 10  
Line 64, Claim 21, "units;" should be --units,--

Column 12  
Line 3, Claim 22, "corn rises" should be --comprises--

Signed and Sealed this  
Thirty-first Day of December, 2013

Margaret A. Focarino  
*Commissioner for Patents of the United States Patent and Trademark Office*